United States Patent [19]
Feren

[11] 3,890,044
[45] June 17, 1975

[54] CAMERA APPARATUS

[75] Inventor: Morton Feren, Livingston, N.J.

[73] Assignee: Martin H. Adler, Westfield, N.J.

[22] Filed: Mar. 13, 1974

[21] Appl. No.: 450,722

[52] U.S. Cl. .................................. 355/62
[51] Int. Cl. .......................... G03b 27/52
[58] Field of Search ............ 355/62, 63; 356/30, 31

[56] References Cited
UNITED STATES PATENTS

| | | | |
|---|---|---|---|
| 1,527,883 | 2/1925 | Lare | 355/63 |
| 1,700,497 | 1/1929 | Heitzler | 356/30 |
| 1,765,277 | 6/1930 | Kousminsky | 355/63 |
| 2,742,813 | 4/1956 | Zeininger | 356/30 |
| 2,983,189 | 5/1961 | Muse | 355/62 |

*Primary Examiner*—John M. Horan
*Attorney, Agent, or Firm*—Sommers & Sommers

[57] ABSTRACT

Apparatus for photographing small objects such as jewelry displays, hardward components, medical exhibits, or the like. A light-tight vertically disposed enclosure includes hinged cover means permitting access to the enclosure interior. A photographic member receiving means is secured to the upper wall of the enclosure for receiving photosensitive members to be exposed in the apparatus, the photosensitive member thereby defining the imaging plane of the apparatus. Lens means are positioned within the enclosure at a plane parallel to and at a fixed spacing with respect to the imaging plane. An object-receiving tray is disposed in spaced relationship beneath the lens. Objects to be photographed are received on the tray, which is movable toward or away from the lens means to thereby bring the object to a desired distance from the lens. One or more electronic flash exposure lights are mounted between the lens and object-receiving tray for illuminating the objects to be photographed. The lens means may be devoid of a shutter, so that exposure control is effected by means of the duration and/or intensity of the light incident on the object, and/or by stopping the lens. An internal wall of the enclosure may carry indicia indicative of the field of focus for an object on the tray, whereby an operator may appropriately position the tray for proper registering of the image.

8 Claims, 1 Drawing Figure

PATENTED JUN 17 1975
3,890,044
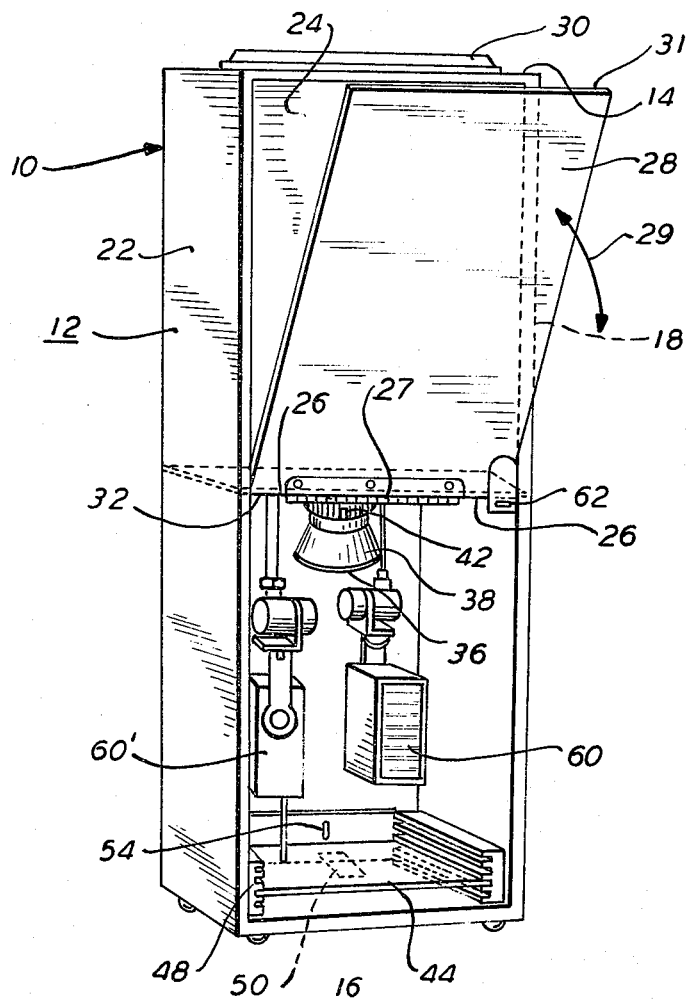

CAMERA APPARATUS

BACKGROUND OF INVENTION

This invention relates generally to photographic apparatus, and more specifically relates to a copy camera of the type particularly adapted for photographing displays of jewelry or precious gems.

The precious gem and jewelry manufacturing industries have experienced a long-felt need for photographic apparatus of low cost and ease of operation, which is yet effective in producing high quality photographs of mounted or unmounted gem displays and various other jewel arrangements. Production of high quality photographs of objects of this type have in the past been provided through the use of conventional or modified copy cameras, which apparatus in general, however, are intended for and principally appropriate for use with two-dimensional graphic materials. In the case of a gem or jewel display, not only are difficulties of focusing, etc. compounded by the three-dimensional nature of the objects, but moreover the nature of the lighting and the manner in which the reflected lighting is incident at the photoreceptor is particularly important, in that the quality of a jewel is indeed partially measured by its optical and light-reflective characteristics as perceived by an observer.

Aside from the use of conventional copy cameras, it has in the past been proposed that a relatively uniform illumination system could be provided by means of some sort of enclosure in which the gem or jewel display was positioned, with fixed lighting arrangements being provided in the enclosure, thereby enabling relatively accurate control of the light incident on the object. In principle, an approach of this sort does not differ markedly from systems that have been known over the years, whereby a photographer, in effect, erects a tent over the object, whereby relatively accurate control of incident light is assured. In prior art approaches of these several types, however, it has been deemed appropriate to utilize (in conjunction with the enclosure) a conventional camera, which is spaced from the object to be photographed. In particular, the said camera which, by way of example, may comprise any of the well-known Polaroid types, has been used, with the customary bellows protruding into the enclosure space; the usual lens and shutter devices are similarly present in cameras of the said type. A principal difficulty with this type of arrangement has been the requirement for displacement of the bellows-mounted lens toward and away from the object plane -- in order to effect focusing. In turn, the variable protrusion of the bellows into the light space modifies the lighting characteristics therein, with resulting destruction of the uniform light characteristics which are sought after. Furthermore, the necessity for utilizing a conventional camera as mentioned, introduces relatively high expense into the system, in that the camera is accompanied by all of the usual appurtenances — most notably an expensive and complex shutter mechanism. Furthermore, depending upon the particular camera used and other characteristics of the system, the variety of lenses which are possible for use in the system, is sharply limited. This is to say that one may not readily interchange lenses as to provide desired characteristics such as focal length, lens quality, or so forth.

In accordance with the foregoing, it may be regarded as an object of the present invention, to provide camera apparatus particularly adapted to the photographing of gems, jewelry displays of the like.

It is a further object of the present invention to provide apparatus for photographing gems, jewelry displays, hardware items, electronic components, medical exhibits, or the like, which is of low cost and highly dependable construction, and which provides highly effective and uniform lighting characteristics under a variety of operating conditions.

It is a yet further object of the present invention, to provide apparatus particularly adapted to the photographing of gems, jewelry displays, and of similar small objects such as hardware, etc. which may be effectively utilized by untrained personnel to yet yield highly uniform and excellent results; and which is furthermore capable of utilization with a large variety of lenses, which may however be interchanged in the apparatus in simple and expeditious fashion.

SUMMARY OF INVENTION

Now in accordance with the present invention, the foregoing objects, and others as will become apparent in the course of the ensuing specification, are achieved in apparatus which includes a light-tight enclosure, which is typically vertically disposed and provided with a movable cover means in a wall thereof, permitting access to the enclosure interior. A photographic member-receiving means is secured to a first wall of the enclosure, for receiving photosensitive members to be exposed in the apparatus. Lens means, which may be devoid of any shutter control, are positioned within the enclosure at a location parallel to the plane of the photosensitive member, the lens means, further, being fixedly spaced with relation to the said first wall. An object-receiving tray is disposed in spaced relationship to the lens, on the side thereof opposite the photoreceptor. Jewelry display, gems, or the like which are to be photographed, are disposed on the tray, which further is movable toward or away from the lens to thereby bring the object to a desired object distance from the lens. One or more electronic flash exposure lights, as for example, so-called "stroboscopic" units, are mounted between the lens and object-carrying tray, for illuminating the materials to be photographed. In the absence of a shutter, exposure control is effected by means of the duration and/or intensity of light incident on the object or objects, and may also be controlled by stopping the lens. An internal wall of the enclosure may carry indicia indicative of the field of focus for objects on the tray, whereby an operator may appropriately position the tray for proper registering of the image on the photoreceptor.

BRIEF DESCRIPTION OF DRAWINGS

The invention is diagrammatically illustrated, by way of example, in the drawings appended hereto in which:

The FIGURE is a perspective view of a preferred form of apparatus in accordance with the invention, certain elements in the FIGURE being shown schematically for purposes of simplification.

DESCRIPTION OF PREFERRED EMBODIMENT

In the FIGURE appended hereto a perspective view appears of a preferred form of apparatus 10 in accordance with the present invention. For purposes of simplification, certain elements of apparatus 10 are depicted in schematic fashion. Where such practice is followed, the thus depicted elements are conventional, commercially known components, which are available from well-known sources.

Apparatus 10 is thus seen to comprise a light-tight enclosure 12 of metal or other suitable materials, the enclosure being defined by upper and lower walls 14 and 16, and by the four lateral walls 18, 20, 22 and 24. Wall 24 extends only to the line 26, whereat there is secured an access cover 28, hinged at 27. The latter permits access to the interior of enclosure 12 in order to enable placement therein of objects to be photographed, and for otherwise permitting servicing of the apparatus, as for example, adjustment of the lighting means or so forth. More specifically the cover 28 may be pivoted as indicated by arrow 29, between an "open" position at which it rests against the exterior of wall 24, and a "closed" position at which the cover 28 closes the lower part of enclosure 12. Apparatus 10, as illustrated in the FIGURE, is particularly predicated on use as a vertically oriented device. This indeed will be the most common mode of use of the apparatus, in that the customary arrangement and operation of same will be such that an object to be photographed, such as a gem or jewel display, or the like, will be positioned within the apparatus by opening hinged cover 28, and relying upon gravity to hold the object in a specific position. However, it is stressed that the vertical disposition generally discussed herein, is not a necessary one to the use of apparatus of the invention—which is equally appropriate for use in horizontal or other orientations, provided that appropriate clamping, friction joints, etc. are present, to assure that the various elements are not inappropriately displaced by gravity.

Upper wall 14 of enclosure 12 is provided with an opening, in which is mounted a conventional photographic member-receiving means 30. Means 30 is a conventional device, and may typically comprise a standard Graflok back (Graflex Division of Singer Corporation, Rochester, N.Y.) in which is mounted a 4 × 5 film holder, such as, for example, a Polaroid 4 × 5 Land Film Holder No. 545, which device is available from Polaroid Corporation, Cambridge, Mass. 02139. Devices of the type mentioned, as is also well-known, are available with auxiliary ground glass focusing screens (also e.g. available from Polaroid Corporation) which may be used in customary fashion to examine the image to be photographed, prior to exposure. It may be considered for purposes of analyzing the present invention that once a film plate is positioned within means 30, the photosensitive surface thereof defines an imaging plane, whereat an image of the object to be photographed is to be focused for exposure.

A lens carrier plate 32 is seen to be positioned across the interior of enclosure 12, as to define a plane which is essentially parallel to the aforementioned imaging plane. A lens 36 is mounted at the center of plate 32, and may be contained within a lens mount 38, which may thread into a suitable opening in plate 32. Lens mount 38 may be provided as well with a variable stop control for the lens, as indicated by the lever 42. (The stopping means can also, of course, be completely separate from the lens mount.) An important aspect of the present invention, which will be further described hereinbelow, is that a conventional shutter mechanism need not in any way be employed with the apparatus. Accordingly, for purposes of illustration, it may be assumed that no shutter mechanism is present at or associated with the lens, although it should, be understood that some types of lenses are only available with self-contained shutter mechanisms. In these latter instances the presence of a shutter is not precluded by the invention, although normal operation of the device will then be predicated upon the shutter remaining in an "open flash" position. It also will be evident in the embodiment of the invention illustrated in the FIGURE, that lens 36 may be readily interchanged with various other lenses as may be desired for use with the apparatus. In the present instance, since such lens may be devoid of accompanying shutter mechanism, and indeed may be devoid as well of stopping means (which may be separate from the lens), it will be clear that wide variety of relatively inexpensive and easily available lenses may be utilized in the present apparatus, which is an important advantage of same.

In accordance with the preferred embodiment of the apparatus as illustrated in the FIGURE, lens 36 is intended to be maintained at a fixed distance spacing with respect to the imaging plane defined by the photosensitive member employed at means 30. Thus, in this preferred embodiment, the lens-carrying plate 32 may be permanently secured at its position in the enclosure 12—it being however within the province of the invention for plate 32 to be displaceable vertically in order to permit adjustment of the apparatus where lenses are interchanged. It is thus important to observe in accordance with the principle of the invention that no bellows arrangement of any type is contemplated—a factor, the significance of which, will shortly become apparent.

Positioned beneath lens 36 and spaced therefrom is an object-receiving tray 44, upon which the objects to be photographed are positioned. In accordance with the principles of the invention, as illustrated in the FIGURE, tray 44 may be adjusted vertically with respect to lens 36, in order to achieve a desired positioning of the object for focusing. In the arrangement depicted, this can be effected by means of a plurality of parallel slots 48, which can support the opposed lateral edges of tray 44. This is to say that the tray may be placed in an appropriate pair of such slots 48, in order to support the tray at a desired distance from the lens 36. Other means can be used, as well, in order to enable the vertical displacement of tray 48. For example, the tray may be supported for vertical movement by a rack and pinion arrangement or so forth.

In use, an object to be photographed is placed upon tray 44, which may be provided on its surface with indicia, as suggested at 50, which define the limits of the useful perimeter of the image on the photosensitive member; such marking is, of course, correlated with the particular lens-type, and respective image and object plane relationships in the device at a given time. For example, in a common mode of use a 1:1 size relationship is desired between image and object, whereby lens 36 is simply a high quality inverting lens, and the spacing between the photosensitive member and lens, and between object and lens, are respectively 1:1.

Since the objects to be photographed, as for example, the gems, etc. are three-dimensional, it will be evident that depending upon the depth of focus of the apparatus, a certain vertical dimension will be present within which sharp focus resides. It is, of course, important to the operator of the device to know precisely where such zone of sharp focusing resides. Accordingly, the present apparatus may be provided with indicia 54 at the interior of lateral wall 20, which indicia extends lengthwise (as a stripe) in the apparatus to define the vertical dimensions within which sharp focusing occurs. The operator, by observing indicia 54 and aligning the top surface or other portions of the gem with the indicia, may be assured that the object is in focus. Where, as previously indicated, the lens is accompanied by a stop control it will, of course, be evident that depending upon the degree of stopping down of the lens, the depth of focus will be varied. In accordance with another aspect of the invention the stop controlling lever 42 may, in its various positions, be associated with color-coded dots or other indicia, which may then be related to corresponding color-coded areas which can define indicia 54. This is to say, that the indicia 54, instead of including a single "stripe," may include a plurality of parallel stripes of differing colors, which correspond to the stopped positions used on the lens. These various parallel stripes are of differing lengths in that the depth of field for focusing increases as the lens is stopped down.

In accordance with a further aspect of the present invention, lighting for the objects positioned on the tray-receiving means 44 is provided by means of one or more electronic flash units 60, which units are mounted to the underside of plate 32 or to the interior lateral walls 14, 16, 16, etc. of the apparatus, in overlying relationship to tray 44. The electronic flash units 60 are per se well-known devices in the art of photography. They are essentially flash discharge tubes, and have indeed come into extremely wide use within recent years for photographic applications. They are particularly suitable for the present application, in that a very precise color balance is possible through the use of such means. Moreover the very high intensity and short pulse duration light emission thereby provided, appear to be particularly appropriate for use in the instant application, in assuring high bounce characteristics in the reflected light from the objects. These characterisfics appear to be very significant in emphasizing in the resulting photograph the aesthetic qualities of the jewel, as such qualities would be perceived by an actual observer of same; which is to say the type of lighting used serves to emphasize in the resulting photograph that which the observer sees from the actual object as the various reflective planes of the gem act upon the incident light.

Typically, the electronic flash units 60 may comprise units such as the AC 480 which is available from the Avgraph Corp. of N.J. under model designations such as AC 480. These units are provided with reflector means, and are swivelable or otherwise controllable in their direction orientation, to achieve desired lighting results.

In accordance with the embodiment of the invention depicted, control of the electronic flash means 60 is enabled by externally mounted switches, as for example, is illustrated at 62. A plurality of such switches are provided, one for each of the units 60 which are present, in that (depending upon the specific requirements of exposure) one or more of the units may be desired for actuation during exposure. As has been previously mentioned, the present device is preferably devoid of any shutter mechanism as such—that is to say, of any conventional shutter associated with lens 36. In practice, therefore, operation of the present apparatus is carried out by emplacing the object or objects to be photographed on tray 44, with the cover 28 in an open position. At this point the photosensitive member, which may have been previously inserted into means 30, is not yet uncovered for use. After the object is appropriately positioned in relationship to the possibly stopped position of lens 36, the cover 28 is closed. At this point the cover for the photographic member is removed to ready the apparatus for exposure. The apparatus is now essentially in an "open flash" position. Thereupon one or more of the electronic flash units 60 are actuated to effect the exposure, after which the photosensitive member is covered in the usual fashion and removed for development.

It will be evident that photographic exposure in apparatus 12, is controlled primarily by the amount of light incident on the object, and by the degree of stopping of lens 38. Although not per se illustrated herein, it is within the province of the invention to utilize as electronic flash means 60, discharge units which include means for varying the intensity and duration of flash. This may be accomplished in conventional fashion: for example, as is well-known, the quantity of light emitted from discharge lamps of the present type varies in accordance with the quantity of electrical charge provided to the condenser commonly present as part of the discharge circuit. Accordingly, as is known, one may vary the capacity of such condenser, whereby the quantity of radiation may be changed; or other well-known electronic techniques for varying the intensity and/or duration of flash may be employed. It will be evident that in a given instance of use, the several factors for varying exposure will be adjusted in order to achieve optional effects in the resulting photograph. "Optimal" effects in this instance may refer not merely to an ideal density in the resulting negative, but also to the production of maximum highlights for the photographed gem, or the production of other aesthetic effects.

Because in the present invention the lighting characteristics in the space between lens and object-carrier remains substantially unmodified by the intrusion of bellows, or the like, into such space, it will be evident that high uniformty and control of such lighting is enabled. In particular, the lens 36, as already indicated, is fixed in relationship to the imaging plane, and accordingly need not in any way be displaced upon a carrier during operation of apparatus 10. At the same time, and partially in consequence, full advantage may be taken of the light bouncing characteristics of the interior walls (which remain available at all times for such purposes), and which may be provided with a highly light-reflective coating such as, for example, white reflective materials or so forth.

While the present invention has been particularly set forth in terms of a specific embodiment thereof, it will be understood that variations upon the invention are possible in view of the present teaching, which yet reside within the scope of the invention.

For example, in a further aspect of the present invention, the lens-carrying plate 32, instead of being fixedly positioned with respect to the photosensitive member, may be displaceable, as for example by means of rack and pinion arrangements, etc. The principal purpose of such an arrangement is to enable variation of the image size as opposed to the object size. For example, it may be desired in a given instance to provide magnification of the object. It may be noted that in an arrangement such as this, the indicia 50 previously described in connection with the object-receiving tray 44, may be defined by a multiplicity of perimeters, which can be related to the various degrees of magnification or diminution which are known to result at the imaging plane in accordance with the vertical position of the lens-carrying plate.

The present invention therefore is to be broadly construed and limited only by the scope and spirit of the claims now appended hereto.

We claim:

1. Photographic apparatus for photographing jewelry displays or the like, comprising in combination:

a light-tight rigid enclosure means;

openable access means for permitting access to the interior of said enclosure;

means secured to a first wall of said enclosure for receiving a photosensitive plate to be exposed by said apparatus, said plate thereby defining the imaging plane of said apparatus;

lens means positioned within said enclosure at a plane parallel to said imaging plane, said lens means being carried by a lens-carrying plate which divides said enclosure and is permanently fixed with respect to said imaging plane and the lateral walls of said enclosure, whereby said lens means is at a fixed spacing with respect to said imaging plane;

an object-receiving tray disposed in vertically spaced relationship from said lens means, and on the side thereof opposite said imaging plane, for receiving objects thereon to be photographed;

means for moving said object-receiving tray toward or away from the fixed plane of said lens means to bring said object to a desired object distance from the said lens;

an internal wall of said enclosure carrying operator viewable indicia indicative of the field of focus in which an object on said tray should be positioned, whereby the spacing of said object with respect to said lens means may be effected by adjusting the position of said tray while observing the vertical positioning of said object as measured by said indicia;

indicia being provided on the surface of said tray indicating the periphery of the field of focus at a given vertical position of said tray, thereby enabling accurate centering of said object on said tray during photographing of said object;

at least one electronic flash exposure light means, disposed between said lens and object, for illuminating said object to be photographed; and the space between said lens means and object-receiving tray being laterally bound by the rigid walls of said enclosure, whereby said space is variable solely in consequence of movement of said object-receiving tray, whereby the lighting characteristics of said space are substantially uniform for all positions of said object-receiving tray.

2. Apparatus in accordance with claim 1, wherein said lens means is shutterless.

3. Apparatus in accordance with claim 1, including a plurality of said electronic flash exposure means mounted to the walls of said enclosure lateral to said first wall and said object-receiving tray.

4. Apparatus in accordance with claim 3, wherein individual of said light units are individually actuated by manual control means external to said enclosure, whereby desired lighting effects may be achieved.

5. Apparatus in accordance with claim 1, wherein said enclosure is provided with a plurality of parallel slots at the end thereof supporting said object tray whereby the position of said tray with respect to said lens is adjusted by positioning said tray in selected of said slots.

6. Apparatus in accordance with claim 1, further including adjustable stopping means for said lens for partially controlling exposure and for partially controlling the depth of focus in said apparatus.

7. Apparatus in accordance with claim 1, wherein said apparatus is vertically disposed.

8. Apparatus in accordance with claim 1, wherein said flash exposure means is of the discharge tube type, and is further provided with circuit means for varying the amount of light generated during a cycle of actuation of said discharge tube, to thereby vary the resultant exposure of said photosensitive member.

* * * * *